Figure 6:
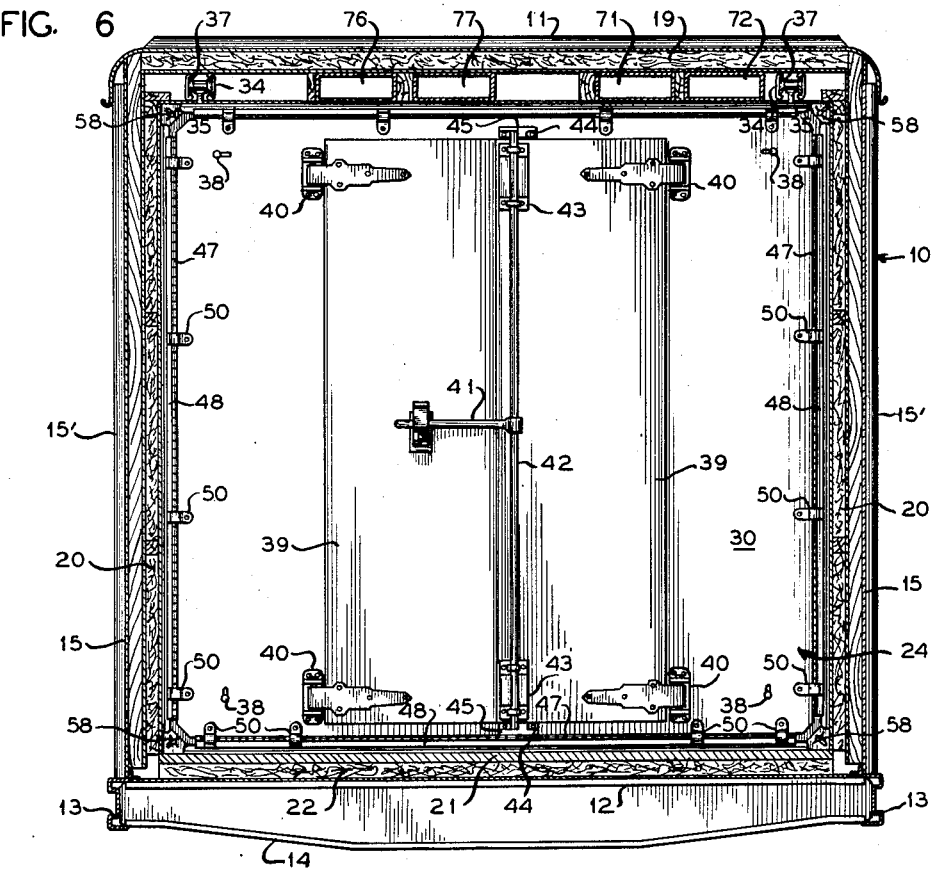

May 4, 1954     J. P. WEHBY     2,677,246
COMPARTMENTALIZED VEHICLE
Filed Nov. 17, 1950     5 Sheets-Sheet 1
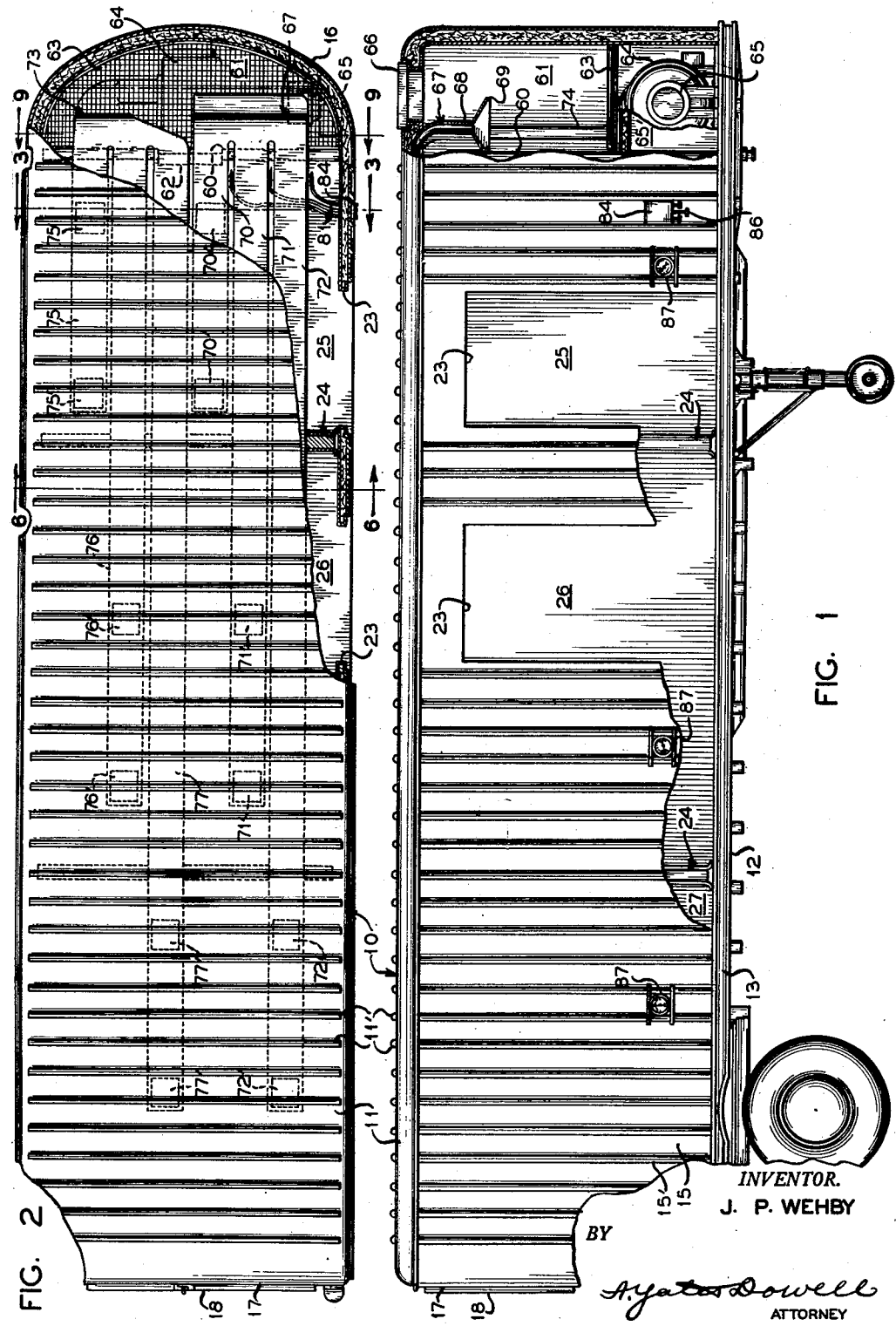
INVENTOR.
J. P. WEHBY
BY
A. Yates Dowell
ATTORNEY May 4, 1954  J. P. WEHBY  2,677,246
COMPARTMENTALIZED VEHICLE
Filed Nov. 17, 1950  5 Sheets-Sheet 2
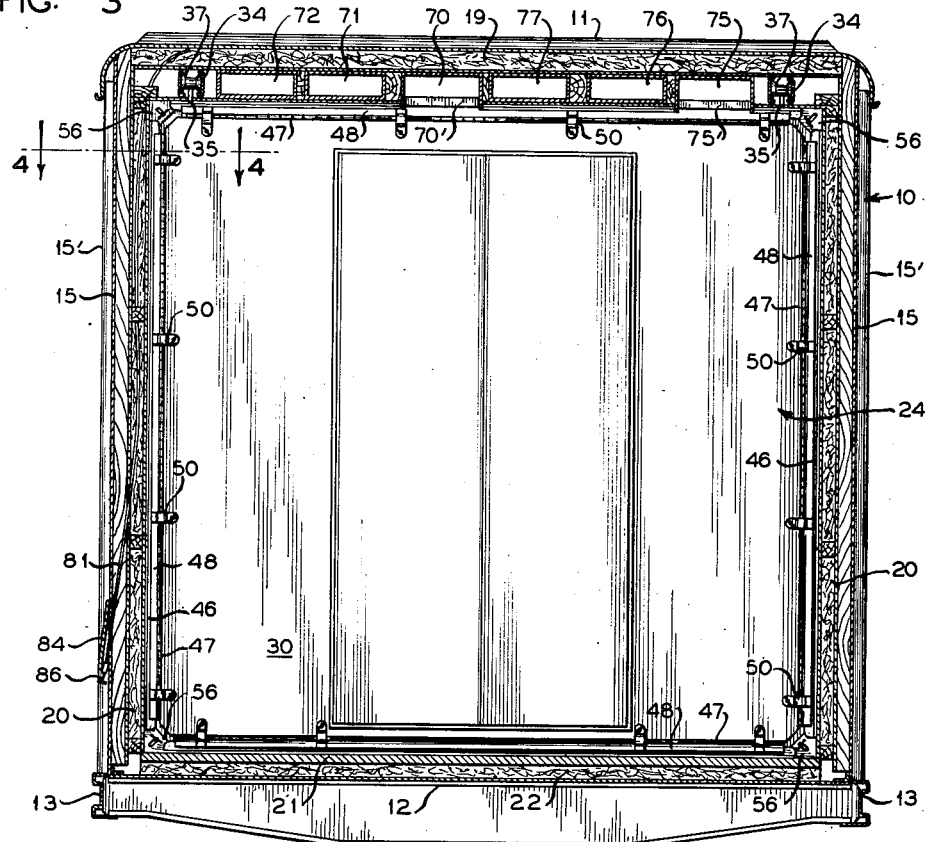
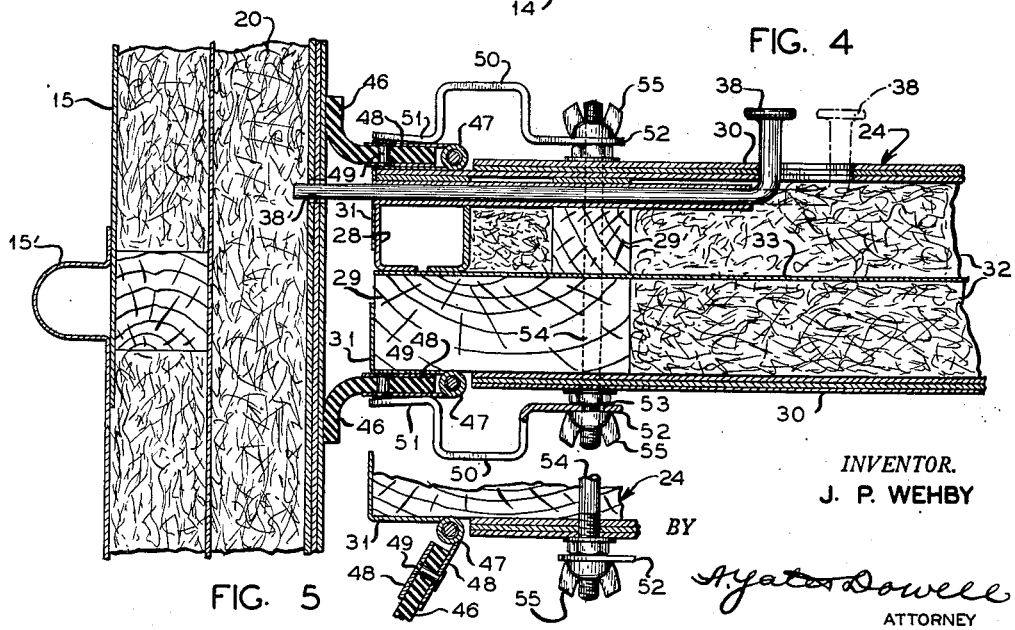
INVENTOR.
J. P. WEHBY May 4, 1954   J. P. WEHBY   2,677,246
COMPARTMENTALIZED VEHICLE
Filed Nov. 17, 1950   5 Sheets-Sheet 3

INVENTOR.
J. P. WEHBY
BY
A. Yates Dowell
ATTORNEY

May 4, 1954   J. P. WEHBY   2,677,246
COMPARTMENTALIZED VEHICLE
Filed Nov. 17, 1950   5 Sheets-Sheet 4
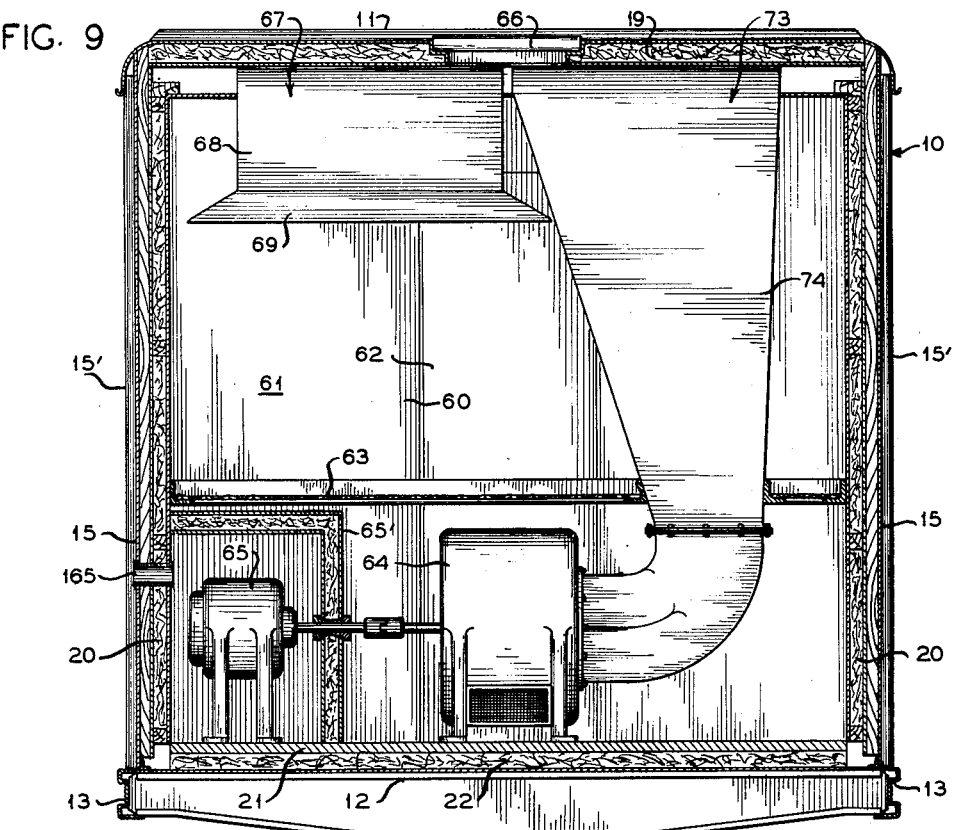
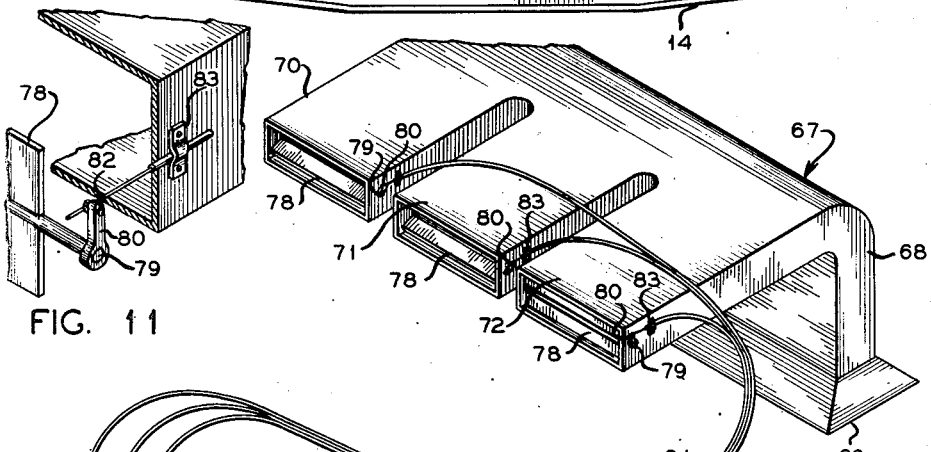
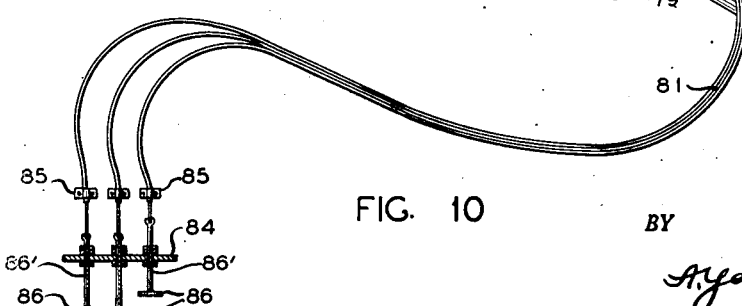
INVENTOR.
J. P. WEHBY
BY
A. Yates Dowell
ATTORNEY Patented May 4, 1954

2,677,246

UNITED STATES PATENT OFFICE 2,677,246

COMPARTMENTALIZED VEHICLE

Jack Phillip Wehby, Nashville, Tenn.

Application November 17, 1950, Serial No. 196,289

9 Claims. (Cl. 62—91.5)

This invention relates to the transportation of commodities and more particularly to the method of transportation and to the structural details of the equipment whereby such transportation is accomplished.

In the transportation of commodities of greatly different characteristics many types of facilities or equipment have been employed and varying processes have been utilized in the operation of such equipment. Certain commodities typified by characteristics of a more or less perishable nature have required extremely careful, closely watched handling, while other commodities may be satisfactorily transported with a substantially lesser degree of care. For example, certain commodities are not susceptible to ready injury through physical contact or by extremes of temperature or humidity, while other products must be carefully handled and suffer disastrous effects from sudden variations in temperature or atmospheric conditions. The present application is a continuation-in-part of co-pending applications, Serial Nos. 109,149, now Patent No. 2,633,714, and 113,659, filed August 8, 1949 and September 1, 1949, respectively, for compartmentalized transportation facilities or vehicles especially designed for the handling and transportation of commodities of varying characteristics.

It is accordingly a major object of the present invention to provide improved transportation equipment and a method of use thereof whereby all types of commodities may be more readily, economically, satisfactorily, and efficiently stored and moved.

It is a further object of the invention to provide compartmentalized transportation equipment or facilities with improved means for controlling conditions of temperature and humidity in one compartment or area of the equipment without identical control or, if desired, without any control of such conditions in other compartments or areas, whereby products requiring refrigeration and humidity control can be transported simultaneously with other products or commodities which do not require such control, and in which the controlled area or areas need only be sufficiently extensive for the commodities requiring the same.

It is a still further object of the present invention to provide improved compartmentalized transportation facilities wherein the size of each compartment may be adjusted or varied as required, in accordance with the nature and quantity of the commodities to be positioned therein, within the physical limits of the facility.

It is a further object of the invention to provide compartmentalized transportation facilities or equipment provided with improved means for the selective and controlled delivery of cooled or refrigerated air to any or all of the compartments thereof, in accordance with the character and requirements of the commodities to be retained or transported therein.

It is a still further object of the present invention to provide novel means for adjusting and controlling the delivery of cooled or refrigerated air to the individual compartments.

Figure 8:
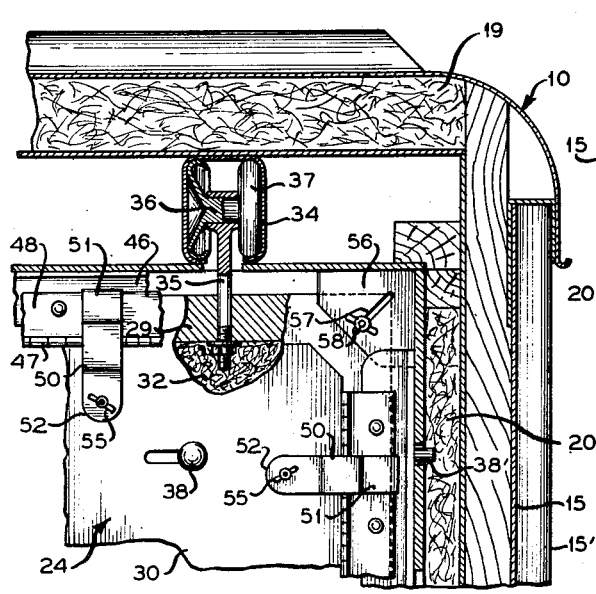
Figure 7:
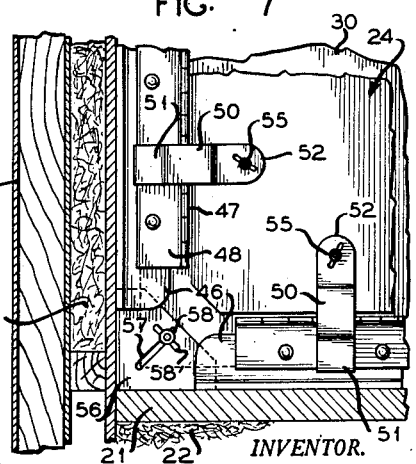
Figure 13:
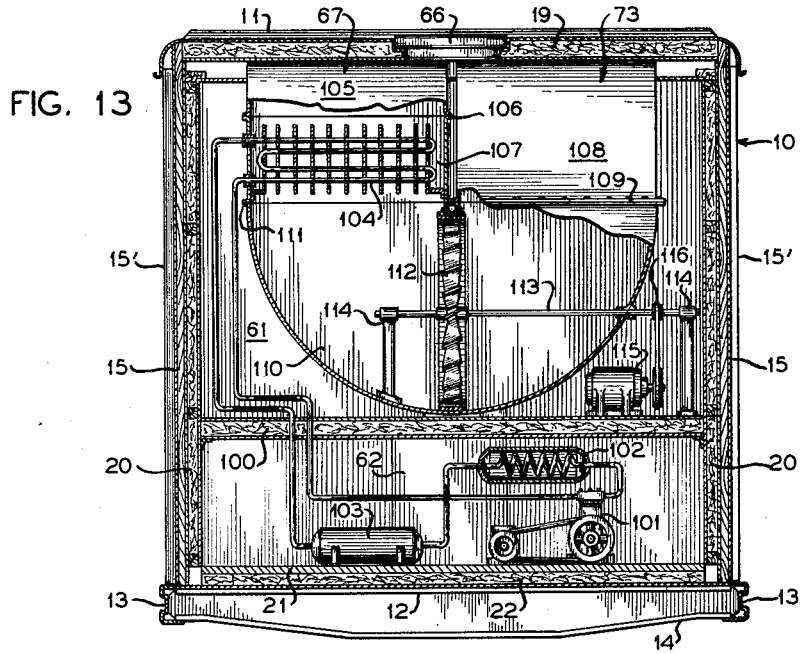
Figure 12:
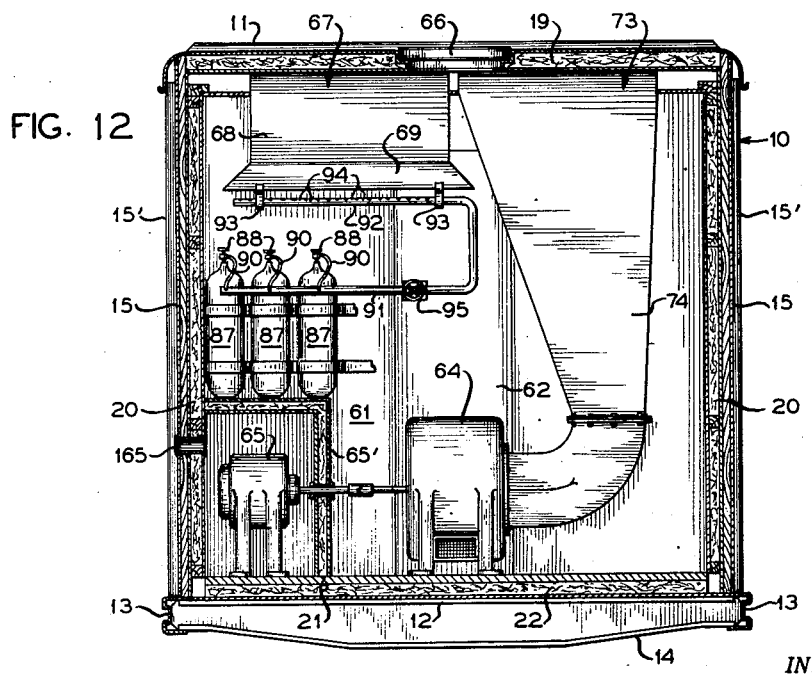

Further objects and advantages of the invention will be apparent from the following specification, taken in conjunction with the accompanying drawings, wherein:

Fig. 1 is a side elevational view of a transportation facility body constructed in accordance with the present invention, parts being broken away, disclosing for purposes of illustration a facility provided with three compartments;

Fig. 2, a top plan view of the transportation facility illustrated in Fig. 1, parts being broken away for greater clarity;

Fig. 3, a transverse sectional view, taken on the line 3—3 of Fig. 2;

Fig. 4, a detail sectional view on a somewhat enlarged scale, taken on the line 4—4 of Fig. 3;

Fig. 5, a fragmentary detail sectional view through the partition sealing means of Fig. 4, illustrating the vertical sealing strip in disengaged position;

Fig. 6, a transverse sectional view through the transportation facility body, taken on the line 6—6 of Fig. 2;

Fig. 7, a fragmentary transverse sectional view illustrating on a somewhat enlarged scale the lower corner of one of the adjustable partitions and the surrounding structure;

Fig. 8, a fragmentary transverse sectional view, also on a somewhat enlarged scale, illustrating an upper corner of one of the adjustable partitions as well as the surrounding structure;

Fig. 9, a transverse sectional view through the transportation facility body, taken on the line 9—9 of Fig. 2;

Fig. 10, a perspective view on a somewhat enlarged scale, illustrating a portion of the inlet ducts and control mechanism detached from the facility body for purposes of clarity;

Fig. 11, a fragmentary perspective view on a still further enlarged scale, illustrating the damper control for one of the inlet ducts;

Fig. 12, a transverse sectional view through the transportation facility body, similar to Fig. 9, illustrating an embodiment of the invention utilizing liquid carbon dioxide as a refrigerant; and Fig. 13, a transverse sectional view similar to Fig. 12 illustrating a further embodiment of the invention utilizing a conventional refrigerating system of the compression type.

Briefly stated, the invention contemplates the provision of a transportation facility body having a plurality of compartments, each of which is readily adjustable as to size. The facility may be a truck or trailer body, a railroad freight car, or any related piece of transportation equipment. Side doors are provided for curb or railroad siding loading and unloading, and a preferred embodiment of the structure also includes rear or end doors. Each compartment is adapted to be refrigerated, or not, as may be required. For this purpose, the facility is provided with a closed space, preferably located at the front end thereof, adapted to receive and retain therein a refrigerating medium, such as Dry-Ice or the like, and air ducts are provided, leading from the closed space or refrigerant compartment and communicating separately with each of the compartments in the transportation facility body. Return ducts are also provided, leading from each of said compartments to the refrigerant compartment so that continuous circulation of appropriately refrigerated air may be had in any or all of the several compartments of the transportation facility body.

Novel means are provided, located exteriorly of the facility body, for selectively regulating or controlling the distribution of refrigerated air to each compartment and visual indicators permit the determination of existing conditions of temperature and humidity in the several compartments in strict accordance with the requirements and characteristics of the commodities stored or transported therein. The walls per se of the transportation facility body are carefully insulated, as are the partitions which separate adjacent compartments, to minimize the possibility of loss of temperature differentials or any inadvertent or accidental change in adjusted conditions resulting from external influences. In addition, since each partition is movable longitudinally of the facility body to control the size or cubic capacity of the several compartments, such partitions are preferably provided with a door, or doors, to permit convenient passage between adjacent compartments without consideration to the relation of the position of the partition with respect to the nearest side door of the facility.

With continued reference to the drawings, the transportation facility has been disclosed, for illustrative purposes, in the form of a trailer body indicated generally at 10 and provided with a roof 11 and floor 12 supported upon suitable longitudinally disposed sills or beams 13 and cross beams 14, as is well known in this art. The side walls 15 of the body merge into the usual curved or arcuate front end wall 16 and the rear end wall 17 is provided with appropriate doors 18 providing access to the interior of the body. It will be understood, however, that the arcuate front end illustrated forms no particular part of the present invention and that any other type of transportation equipment may be employed, such as a truck, railroad car, or the like, provided with end doors at one or both ends thereof, as may be desired.

The roof 11 and side walls 15 illustrated are fabricated from suitable spaced sheet material, the exterior sheets being metallic and corrugated as indicated at 11' and 15', respectively, for purposes of both strength and ornamentation. Suitable studs or other supporting framework is provided between the outer metallic sheets and inner plywood sheets illustrated, forming roof and walls and the roof is carefully insulated throughout the entire length thereof, as indicated at 19. Similarly, the side and end walls are provided with insulation 20, care being exercised to thus minimize any effect that external temperature or other conditions may have upon the interior of the facility body.

The floor 12 preferably includes a particularly durable and wear resistant upper surface 21 of hard wood or the like, maintained spaced thereabove, appropriate insulation 22 being provided between the surface 21 and the floor 12.

As will be more readily apparent from an examination of Figs. 1 and 2 of the drawings, at least one of the side walls 15 of the body is provided with a plurality of strategically spaced apertures 23 providing access to the interior of the body forwardly of the rear end thereof. Suitable doors (not shown) are hingedly or otherwise mounted within the apertures 23. Preferably these doors are appropriately insulated and are adapted to be secured in closed position by any suitable form of locking mechanism or latches, as is well known in this art. Two apertures 23 have been illustrated to provide access to forward and intermediate compartments within the facility body, access to the rear portion thereof or compartment being conveniently had through the doors 18. Obviously a greater number of apertures and doors may be provided in the side walls.

As illustrated more particularly in Fig. 1 of the drawings, the provision of two movable partitions 24 provides compartments 25, 26 and 27, of desired dimensions insofar as the lengths of such compartments are concerned, within the trailer body 10. Access to the forward and intermediate compartments 25 and 26 may be had through the associated apertures 23 in the side wall 15; access to the rear compartment 27 is had through the rear doors 18.

To permit of adjustment or variation of the lengths of the several compartments, in accordance with the requirements, nature and quantity of commodities to be stored, placed or transported therein, the partitions 24 are movable longitudinally of the facility body, any desired means being employable to provide for such adjustable movement. Preferably each partition includes juxtaposed metallic and wooden framework, indicated respectively at 28 and 29, defining the periphery of the partition and suitably secured to each other. Facings 30, of plywood or the like, are mounted upon opposite sides of the combined partition framework, annular moldings 31 being employed to provide a finished structure. Two or more layers of suitable insulation 32, such as fiberglass or the like, are disposed between the facings 30, adjacent layers being separated by a sheet 33 of ropecraft paper. Partitions fabricated in this manner have been found to be particularly durable and to have superior insulating characteristics.

The partitions 24 are suspended from longitudinally disposed rails or tracks 34 mounted within the roof 11 of the facility body. These tracks, which may be secured within the roof structure by any desired means, such as welding, bolts, rivets, or the like, parallel the side walls of the body and are preferably located substantially adjacent thereto. Vertically disposed brackets 35 are mounted upon the upper edge of each partition 24, each bracket terminating in a bearing portion 36. Dual wheeled rollers 37 are journalled within the bearings 36, these rollers being of an appropriate size to engage accurately within the tracks 34. From an examination of Figs. 6 and 8 of the drawings it will be apparent that the partitions 24 are thus suspended from the overhead tracks, the rollers 37 serving to eliminate any substantial friction and insuring the free and easy movement of the partitions to adjusted positions.

Any desired means may be provided for securely locking or retaining the partitions 24 in desired adjusted position and preventing accidental movement thereof. Such means has been illustrated as horizontally and vertically disposed sliding bolts 38 mounted upon the partitions and adapted to project therebeyond, being receivable within suitable apertures 38' in the side walls 15 and flooring 21.

Preferably each partition 24 is provided with a door or doors 39 hingedly mounted as indicated at 40 whereby access may be had within the facility body between adjacent compartments, suitable locking means 41 being provided for maintaining such doors secured. A preferred embodiment of such locking means comprises a vertically disposed bolt or rod 42, rotatably journalled within suitable bearings 43 and provided with offset or camming extremities 44 receivable within suitable keepers 45, as is well known in this art. Each partition door is appropriately insulated to prevent possibility of loss of temperature differential between adjacent compartments.

To prevent interchange of air between the several compartments, when the doors in the partitions are closed, suitable sealing means is provided to prevent passage of air between the periphery of each partition and the walls 15 of the facility body 10. A preferred embodiment of such sealing means has been disclosed as flaps 46, of rubber, leather, or other suitable material, secured to the faces of each partition adjacent the top, bottom and side edges thereof. These flaps project beyond the periphery of the partition and frictionally engage with the adjacent wall surface of the interior of the facility body.

Each flap 46 is of slightly less length than the edge of the partition to which it is secured and piano hinge structure 47 is provided for mounting these flaps. Each hinge member includes a pair of spaced leaves 48, the flaps 46 being secured therebetween by suitable rivets 49, or the like. Spaced clamping members 50 are provided for securely maintaining the flaps 46 in frictional and sealing engagement with the adjacent wall structure, each clamp including a flap engaging portion 51 and a mounting portion 52 provided with an aperture 53. As will be more readily apparent from an examination of Fig. 4 of the drawings, rods 54 extend through the framework 29 and 29' of each partition, the threaded extremities of these rods projecting through the apertures 53 in the clamping members. Wing nuts 55, or the like, are provided for retaining the clamping members in engaging position and maintaining an effective seal between the flaps 46 and the wall surface of the facility body. When the partitions are to be moved or otherwise adjusted, the wing nuts are loosened and the clamping members rotated to the position illustrated fragmentarily in Fig. 5 of the drawings. The flaps 46 may then be pivoted to the position illustrated where frictional engagement with the adjacent wall surface will not be had. If desired, the flaps 46 may be secured to but one face of each partition, in which event the bolts 38 need not be recessed within the partitions. Where sealing flaps are employed on both sides of the partitions, it has been found practical to provide tubular sleeves 138 within which the bolts 38 are reciprocably mounted, the head portion of each bolt projecting through an appropriate slot 139 provided in the partition whereby ease of manipulation is had.

To provide for an air seal at the four corners of each partition 24 corner sealing members 56 are provided, as more fully illustrated in Figs. 7 and 8 of the drawings. Each sealing member 56 comprises a plate of suitable material, such as hard rubber or the like, provided with an angularly disposed slot 57. A rod or stud 58, secured to the partition adjacent the corner thereof, projects through the slot 57 and a wing nut 58' or the like is provided for locking the plate 56 in sealing position. The wall engaging surfaces or edges of the sealing members 56 are disposed at a 90° angle with respect to each other so as to engage with the meeting wall surfaces in the corners of the facility body, and an effective seal is thus provided for the corners of the partitions, beyond the limits of the sealing flaps 46. It will be obvious that loosening of the wing nuts 58' will permit necessary freedom of movement of the plates 56, when it is desired to adjust a partition 24. The sealing members 56 may be employed on both sides of each partitions, or, if desired, on but one side thereof, the present disclosure providing for flaps 46 and corner sealing members 56 on both sides of each partition.

A compartmentalized facility or vehicle body of the character thus described permits the side-by-side transportation in a single piece of equipment of a plurality of commodities of varying characteristics which may require widely different conditions of temperature and humidity. If desired, commodities for which definite conditions of temperature and humidity are essential may be carried in one compartment while products having widely different characteristics could be placed in adjacent or other compartments where temperature and other conditions would not be identically controlled. For example, where three compartments are provided, frozen products could be carried in one compartment at a relatively low or subfreezing temperature while commodities such as fruit, eggs, or the like, which cannot withstand temperature conditions of this character, may be carried in another of the compartments which would be maintained at a temperature appropriately above the freezing point. At the same time other commodities which are not readily affected by normal conditions of temperature and humidity, such as canned goods, potatoes, flour, and numerous articles other than food products, may be conveniently transported in the remaining compartment.

Preferably the curved or arcuate front end of the facility body illustrated is utilized for the housing of suitable refrigerating mechanism or the retention of a refrigerating medium, such as Dry Ice or the like, together with means for distributing cold or refrigerated air, when required, to the interior of the facility body. The preferred embodiment of such an arrangement disclosed comprises a fixed and insulated wall 60, extending transversely of the facility body and defining a refrigerating compartment 61, a suitable door 62 being provided in the wall 60 whereby convenient access may be had to the interior of the refrigerating compartment. A horizontally disposed supporting grill or the like 63 extends across the space or compartment 61 and is intended for the reception of the refrigerant utilized.

Air distributing means, such as a fan or blower 64 intended to be driven by a suitable electric motor 65 is mounted upon suitable brackets or other structure secured to the floor 21 of the facility body, beneath the grill 63. Suitable locking means, not shown, is provided for the door 62; and, if desired, the roof 11 of the facility body may be provided with an insulated closure 66, in the nature of a trap-door, providing access to the interior of the refrigerating compartment 61 from the exterior of the facility. Upon removal of the closure 66, refrigerant medium may be deposited upon the grill 63, thus avoiding any necessity for entering the body 10, with possible disturbance of commodities placed therein, to service the refrigerant compartment or replenish the contents thereof. Suitable locking means, also not shown, is provided for the closure member 66.

Air duct means is provided for conveying refrigerated air from the compartment 61 to the interior of the body 10. A preferred embodiment of such means has been illustrated as a substantially L-shaped duct 67 having a vertically depending inlet 68 positioned within the refrigerating compartment above the grill 63, the mouth of the duct inlet being enlarged and outwardly flared as indicated at 69. The duct 67 includes a plurality of longitudinally extending and horizontally disposed outlet portions, preferably of graduated lengths, for delivering or discharging refrigerated air into the several compartments. Three of such horizontally disposed outlet portions have been illustrated, preferably positioned within the insulated roof 11 of the body for space conserving purposes. As will be more readily apparent from an examination of Fig. 2 of the drawings, the shortest outlet portion 70 delivers refrigerated air to the forward compartment 25 and is provided with one or more spaced outlet vents 70' located along the length thereof. The outlet portion 71 delivers refrigerated air to the intermediate compartment 26 and is also provided with one or more spaced outlet vents 71'. Similarly, the outlet portion 72 which is of greatest length, delivers refrigerated air to the rear compartment 27 of the body and includes appropriately spaced outlet vents 72'. If desired, the vents 70', 71' and 72' may include downwardly directed wall structure which fits snugly and is secured within appropriately positioned apertures provided in the metallic or plywood interior surface of the roof, thus precluding possibility of entry of air, refrigerated or otherwise, into the roof of the body.

To permit for relatively continuous circulation of refrigerated air, where desired or required, a return air duct 73 is provided, similar in general appearance to the duct 67. The return duct includes a vertically depending and downwardly tapered portion 74, communicating with the inlet side of the blower 64, and comprises a plurality of longitudinally extending and horizontally disposed intake portions, preferably of graduated lengths, for receiving air from the several compartments. Three of such intake portions have been illustrated, substantially identical to the outlet or discharge portions of the duct 67 and also positioned within the insulated roof 11 of the body of the facility. The shortest intake portion 75 receives air from the forward compartment 25 and is provided with one or more spaced inlets 75', suitably located along the length thereof. The intake portion 76 receives air from the intermediate compartment 26 and is also provided with one or more spaced inlets 76', while the intake portion 77, which is of greatest length, receives air from the rear compartment 27 and is provided with one or more spaced inlets 77'. Preferably the spaced inlets 75', 76' and 77' include downwardly directed wall structure which fits snugly and is secured within appropriately positioned apertures provided in the metallic or other interior surface of the roof 11.

Any suitable type of automatically or manually controllable closure means is provided for the outlet portions of the duct 67, a preferred embodiment thereof being illustrated as a shutter or valve member 78, pivotally mounted at 79, and of a size substantially conforming to the interior of the outlet portion of the duct. Three such valve members are provided, one for each of the outlet portions 70, 71 and 72. Preferably the pivotal mounting 79 of each valve member projects through a side wall of the outlet portion of the duct and has an arm or relatively short lever 80 fixedly secured thereto. Flexible cables 81, such as Bowden wires, are connected to the levers 80 by means of screws or the like 82, the adjacent extremities of the conduits through which such wires pass being secured by clamping members 83. A control box 84 is mounted upon a side wall 15 of the body, exteriorly thereof, clamping members 85 being provided within said control box for securing the opposite extremities of the conduits. Preferably the Bowden wires or cables 81 are concealed within the roof and side wall of the body so that inadvertent injury or damage may not be inflicted thereupon. The free extremities of the flexible cables project through a wall of the control box and are provided with operative handles 86 disposed with a view to convenient accessibility. This arrangement has been carefully illustrated, somewhat diagrammatically, in Fig. 10 of the drawings where it will be noted that the stem portions of the handles may be appropriately marked or graduated as indicated at 86' so that accurate setting of the valve members 78 may be had in strict accordance with the requirements of the compartment associated with each outlet duct and control handle.

With the fan or blower 64 and motor 65 in operation, and a suitable refrigerant such as Dry Ice, or the like, positioned upon the grill 63, refrigerated air will be forced from the top of the refrigerating compartment 61 into the mouth 69 of the inlet portion 68 of the cold air duct 67 and into the outlet portions 70, 71 and 72. Such refrigerated air will be conveyed to predetermined outlets within the facility body 10, or to selected compartments thereof, through the outlet vents whereby localized conditions of temperature may be maintained in exact accordance with the specific requirements and locations of commodities positioned within said body. Since the body is substantially air tight, the doors thereof being sealed when in closed position, air delivered or forced into any or all of the several compartments will be returned to the blower in the refrigerating compartment through the inlet portions of the air return duct 73, to be again cooled or refrigerated by passage over the refrigerant medium and recirculated in the above described manner.

As has been illustrated with greater particularity in Fig. 9 of the drawings, the blower motor 65 is enclosed within a suitably insulated housing or compartment 65' so that such heat as is generated by the motor will not be dissipated into the refrigerating compartment 61. Preferably the motor housing is located adjacent a side wall of the transportation facility body and suitable vents 165 are provided, furnishing communication between the motor compartment and the outside atmosphere, whereby appropriate temperature may be maintained within the motor compartment at all times.

It will be understood that it is contemplated that types of refrigeration other than that described here above may be employed with equal convenience within the transportation facility illustrated. For example, as illustrated in Fig. 12 of the drawings, liquid carbon dioxide (or other suitable gaseous refrigerant) may be substituted for the Dry Ice referred to herein. Such a substitution may be made without requiring any change in either the cold air duct 67, the return duct 73, or the blower and motor 64 and 65, respectively. To provide for more ready circulation of air from the blower 64 within the refrigerant compartment 61, the grill 63 may be removed and a battery of suitable tanks 87, containing an appropriate liquid refrigerant such, for example, as carbon dioxide gas, may be detachably supported upon the wall 60 of the compartment 61 by brackets or the like 88 or in any other desired manner.

Each tank 87 includes the usual valve 89, as is well known in this art, and outlet tube 90, these tubes having connection with a common discharge conduit 91 whereby liquid refrigerant may be conveyed to the immediate vicinity of the enlarged mouth 69 of the vertically depending inlet 68 of the cold air duct 67. As illustrated, the conduit 91 may have a horizontally disposed portion 92 supported immediately beneath the inlet mouth of the cold air duct by brackets or the like 93. A plurality of spaced apertures 94 are provided in the horizontally disposed portion 92 of the conduit 91 and thus gaseous refrigerant from the battery of tanks 87 may be discharged directly into the inlet of the cold air duct 67.

The conduit 91 is provided with a valve 95 for controlling the rate of discharge of refrigerant from the tanks 87. If desired, suitable automatic or thermal control (not shown) may be provided for the valve 95 whereby an intermittent or variable rate of discharge may be had, in accordance with required conditions within the several compartments of the facility body.

While a battery of tanks 87 has been illustrated, a single tank may be adequate to maintain desired temperature conditions for a relatively short period of time, or where low temperature is not required. However, where goods are to be transported over a substantial distance or stored for a relatively long period of time, an appropriate number of tanks will obviate any necessity for replenishment of refrigerant or other disturbance of the facility body.

With the blower 64 in operation, and refrigerant being discharged through the apertures of the discharge conduit 91, air will be forced from the refrigerant compartment into the cold air duct carrying therewith gaseous refrigerant. Refrigerated air will thus be conveyed to the several compartments as may be required, through the outlets 70', 71' and 72', respectively. Simultaneously, since we are here concerned with a pressure system within a substantially sealed body, air will be returned from the compartments through the return air duct 73 to the inlet side of the blower 64.

As stated, any suitable refrigerating medium may be employed, and it is also within the scope of the invention to provide supporting means within the refrigerant compartment whereby water ice may be employed as a refrigerant in connection with the identical distributing system contemplated. Such a modification has not been illustrated, since it would require but a suitable container for the water ice and an appropriate drain. Where particularly low temperature is not required, water ice has been found entirely satisfactory for comparatively short periods of time or with appropriate replenishment of the ice supply.

An embodiment of the invention has been illustrated in Fig. 13 of the drawings where a conventional refrigeration system of the compression type is employed. Such a system normally employs a compressor, condenser, receiver and evaporator, and preferably such apparatus, except for the evaporator, is appropriately insulated from the refrigerating compartment 61.

As will be apparent from an examination of this figure of the drawings, the refrigerating compartment 61 is provided with a horizontally disposed insulated wall or partition 100, the compressor 101, condenser 102 and receiver 103, which are illustrated somewhat conventionally, being located beneath the partition 100. The evaporator 104, which has been illustrated as of conventional coil type, is located immediately beneath the vertically depending inlet 105 of the cold air duct 67, a flanged connection 106 being provided between the lower extremity of the inlet 105 and the evaporator housing 107.

To provide a completely enclosed system, the return duct 73 is provided with a vertically depending outlet 108 which has a flanged connection 109 with the upper extremity of one leg of a substantially U-shaped fan housing 110, the opposed leg of this housing having flanged connection with the lower extremity of the evaporator housing 107.

A fan 112, secured to a horizontally disposed shaft 113 journalled in suitable bearings 114, is mounted within the housing 110 transversely thereof, power being supplied to the fan through a motor 115 and belt 116.

In operation, the compressor 101 forces a suitable gaseous refrigerant into the condenser 102 where condensation takes place, liquid refrigerant being conveyed to the receiver 103 and thence to the evaporator 104 where, due to the absorption of heat, the liquid refrigerant is vaporized, cooling the coil of the evaporator, and then returned to the inlet side of the compressor from which point the cycle is repeated. The fan 112 blows air against the cooled evaporator, refrigerating this air which is then forced through the cold air duct 67 into the several compartments as may be required. Simultaneously air will be returned from these compartments through the return air duct 73 to the inlet side of the fan 112. Such a system is well known in the refrigerating art and, it is believed, requires no further discussion here.

It will be readily understood from the foregoing that the present invention provides an improved transportation facility body of widely flexible use in which the number of compartments and the size of each, as well as the conditions of temperature and humidity under which each compartment is maintained, may be varied in accordance with the commodities transported as well as climatic conditions encountered en route. If but a single compartment is desired, all of the partitions 24 may be moved to a position adjacent the wall 60 of the body 10, access to the interior of the facility being possible through either the rear doors 18 or any of the side doors. If but two compartments are indicated as advantageous, one partition 24 may be moved to a position adjacent the wall 60 or, if preferred, adjacent the rear wall 17, while the other partition, where only two partitions are employed, might be moved to some intermediate position. Conditions of humidity within the several compartments may be controlled or modified in any desired manner as by the atomization of water by conventional means, the utilization of a suitable drying agent, or other means as is well known in this art.

Visual indicators may be provided for disclosing temperature conditions within the body 10, or any of the compartments thereof. A preferred embodiment of such indicating means may comprise a plurality of temperature indicators (not shown) of any suitable type spaced along an interior side wall of the body and having dials 87, or other recording means, associated therewith and located exteriorly of the facility body. Preferably at least one indicating means is provided for each compartment and the readings on the recording means 87 will be an accurate reflection of temperature conditions within the several compartments without any necessity for disturbing the interior of the facility body or the commodities placed therein.

While the electric motor 65 of the blower 64 is intended to be operated by the storage battery or electric power plant of the facility or vehicle itself, it will be understood that when the body 10 remains at rest over an appreciable period of time and continued refrigeration control is required, any external source of electrical energy, not shown, may be employed. For this purpose, the body may be provided with electrical conductors intended for connection with any suitable source of electrical current, and having appropriate electrical connection with the blower motor.

It will be obvious to those skilled in this art that various changes may be made in the invention without departing from the spirit and scope thereof and therefore this invention is not limited by that which is shown in the drawing and described in the specification, but only as indicated in the appended claims.

What is claimed is:

1. A transportation facility comprising a body including top, bottom, side and end walls, doors in one of said side and end walls affording access to the interior of said body, movable rigid partitions dividing said body into a plurality of compartments, doors in said partitions affording access therethrough, locking means for said doors, longitudinally disposed track members mounted within said top wall, hangers mounted upon the upper edge of said partitions, rollers journalled in said hangers engaging said tracks and permitting ready movement of said partitions longitudinally of said body to vary the lengths of said compartments, locking means mounted upon said partitions and adapted to engage within apertures provided in said side and bottom walls for securing said partitions in position, a closed refrigerating compartment adjacent one extremity of said body, means providing access to said refrigerating compartment interiorly of said body, means providing access to said refrigerating compartment exteriorly of said body, a duct provided with a plurality of horizontally disposed branches of graduated lengths disposed within the top wall of said body and communicating with said refrigerating compartment, means within said refrigerating compartment for forcing refrigerated air through said duct, said duct being provided with spaced vents communicating with the compartments in said body, valve means within each branch of said duct for selectively controlling the passage of air therethrough, control means operable exteriorly of said body for regulating said valve means, a second duct provided with a plurality of horizontally disposed branches of graduated lengths disposed within the top wall of said body and provided with spaced inlets for returning air from said compartments to said refrigerating compartment, flexible sealing flaps hingedly mounted upon said partitions and engaging the top, bottom and side wall surfaces of said body to prevent passage of air about the peripheries of said partitions, clamping means for maintaining said sealing flaps in engaging position, angularly movable corner plates mounted upon said partitions and cooperating with said sealing flaps, and visual indicators mounted on said body exteriorly thereof for disclosing conditions of temperature in each of said compartments.

2. A transportation facility comprising a body including top, bottom, side and end walls, doors in one of said side and end walls affording access to the interior of said body, movable rigid partitions dividing said body into a plurality of compartments, doors in said partitions affording access therethrough, longitudinally disposed track members mounted within said top wall, hangers mounted upon the upper edge of said partitions, rollers journalled in said hangers engaging said tracks and permitting ready movement of said partitions longitudinally of said body to vary the lengths of said compartments, locking means mounted upon said partitions for securing said partitions in adjusted positions, a closed refrigerating compartment disposed at one end of said body, means providing access to said refrigerating compartment, a duct provided with a plurality of horizontally disposed branches of progressively graduated lengths mounted within the top wall of said body and communicating with said refrigerating compartment, spaced vents in said branches, means within said refrigerating compartment for forcing refrigerated air through said duct, valve means within each branch of said duct for selectively controlling passage of air therethrough, control means operable exteriorly of said body for regulating said valve means, a second duct provided with a plurality of horizontally disposed branches of progressively graduated lengths disposed within the top wall of said body and provided with spaced inlets for returning air from said compartments to said refrigerating compartment, flexible sealing flaps hingedly mounted upon said partitions and engaging the top, bottom and side wall surfaces of said body, clamping means for maintaining said sealing flaps in engaged position, angularly movable corner plates mounted upon said partitions and cooperating with said flaps to prevent passage of air about the peripheries of said partitions, and visual indicators mounted on said body exteriorly thereof for disclosing conditions of temperature in each of said compartments.

3. A transportation facility comprising a body including top, bottom, side and end walls, doors in one of said side and end walls affording access to the interior of said body, movable rigid partitions dividing said body into a plurality of compartments, doors in said partitions affording access therethrough, longitudinally disposed track members mounted within said top wall, hangers mounted upon the upper edge of said partitions and engaging said tracks to suspend said partitions therefrom and permit ready movement of said partitions longitudinally of said body to selectively vary the lengths of said compartments, locking means for securing said partitions in adjusted positions, a refrigerating compartment disposed at one extremity of said body, means providing access to said refrigerating compartment, a duct provided with a plurality of horizontally disposed branches of progressively graduated lengths mounted within the top wall of said body and communicating with said refrigerating compartment, spaced vents in said branches, means within the refrigerating compartment for forcing refrigerated air through said vents, valve means within each branch of said duct for selectively controlling passage of air therethrough, control means operable exteriorly of said body for manually regulating said valve means, a second duct provided with a plurality of horizontally disposed branches of progressively graduated lengths disposed within the top wall of said body and provided with a plurality of spaced inlets for returning air from said compartments to said refrigerating compartment, flexible sealing flaps hingedly mounted upon said partitions and engaging the top, bottom and side wall surfaces of said body, clamping means for maintaining said flaps in sealing position, angularly movable corner plates mounted upon said partitions and cooperating with said flaps for preventing passage of air about the peripheries of said partitions, and visual indicators mounted on said body exteriorly thereof for disclosing conditions of temperature in each of the compartments.

4. A transportation facility comprising a body including top, bottom, side and end walls, doors in one of said side and end walls affording access to the interior of said body, movable rigid partitions dividing said body into a plurality of compartments, doors in said partitions affording access therethrough, longitudinally disposed track members mounted within said top wall, hangers mounted upon said partitions for engaging said track members to suspend said partitions therefrom and permit ready movement of said partitions longitudinally of said body to selectively vary the lengths of said compartments, a closed refrigerating compartment disposed at the extremity of said body remote from the end wall provided with doors, means providing access to said refrigerating compartment, a duct provided with a plurality of horizontally disposed branches of progressively graduated lengths mounted within the top wall of said body and communicating with said refrigerating compartment, spaced vents in said branches, means within said refrigerating compartment for forcing refrigerated air through said vents, valve means within each branch of said duct for selectively controlling passage of air therethrough, control means operable exteriorly of said body for manually regulating said valve means, a second duct provided with a plurality of horizontally disposed branches of progressively graduated lengths mounted within the top wall of said body and provided with a plurality of spaced inlets for returning air from said compartments to the refrigerating compartment, sealing means mounted upon said partitions and engaging the adjacent top, bottom and side wall surfaces of said body to prevent passage of air about the peripheries of said partitions, and visual indicators mounted on said body exteriorly thereof for disclosing conditions of temperature in each of the compartments.

5. A transportation facility comprising a body including top, bottom, side and end walls, doors in one of said side and end walls affording access to the interior of said body, movable rigid partitions dividing said body into a plurality of compartments, means for locking said partitions in adjusted positions, doors in said partitions affording access therethrough, a closed refrigerating compartment disposed at the extremity of said body remote from the end wall provided with doors, means providing access to said refrigerating compartment, a duct provided with a plurality of branches of progressively graduated lengths mounted longitudinally of said body within a wall thereof and communicating with said refrigerating compartment, spaced vents in said branches, means within said refrigerating compartment for forcing refrigerated air through said duct, valve means within each branch for selectively controlling the passage of air therethrough, control means operable exteriorly of said body for manually regulating said valve means, a second duct provided with a plurality of branches of progressively graduated lengths mounted longitudinally of said body within a wall thereof and provided with a plurality of spaced inlets for returning air from said compartments to the refrigerating compartment, sealing means mounted upon said partitions and engaging the adjacent top, bottom and side wall surfaces of said body to prevent passage of air about the peripheries of said partitions, and visual indicators mounted on said body exteriorly thereof for disclosing conditions of temperature in each of the compartments.

6. A transportation facility comprising a body including top, bottom, side and end walls, doors in one of said side and end walls affording access to the interior of said body, movable rigid partitions dividing said body into a plurality of compartments adjustable longitudinally of the body, means for locking said partitions in adjusted positions, doors in said partitions affording access therethrough, a closed refrigerating compartment disposed at the extremity of the body remote from the end wall provided with doors, means providing access to said refrigerating compartment, a duct provided with a plurality of branches of progressively graduated lengths mounted longitudinally of said body and communicating with said refrigerating compartment, spaced vents in said branches, means within said refrigerating compartment for forcing refrigerated air through said duct and into said compartments, valve means within each branch for selectively controlling the passage of air therethrough, control means operable exteriorly of said body for manually regulating said valve means, a second duct provided with a plurality of branches of progressively graduated lengths mounted longitudinally of said body and provided with a plurality of spaced inlets for returning air from said compartments to the refrigerating compartment, sealing means mounted upon said partitions for preventing passage of air around the peripheries thereof, and visual indicators mounted on said body exteriorly thereof for disclosing conditions of temperature within each of the compartments.

7. A transportation facility comprising a body including top, bottom, side and end walls, doors in one of said side and end walls affording access to the interior of said body, rigid partitions movable longitudinally of the body and dividing said body into a plurality of compartments adjustable as to length, doors in said compartments for providing access therethrough, a closed refrigerating compartment disposed at the extremity of said body remote from the end wall provided with doors, means providing access to said refrigerating compartment, a duct provided with a plurality of branches of progressively graduated lengths mounted in said body and communicating with said refrigerating compartment, spaced vents in said branches, means within the refrigerating compartment for forcing refrigerated air through said branches into said body, valve means within each branch for selectively controlling the passage of air therethrough, control means disposed exteriorly of said body for manually regulating said valve means, a second duct provided with a plurality of branches of progressively graduated lengths provided with a plurality of spaced inlets for returning air from the body to the refrigerating compartment, sealing means mounted upon said partitions for preventing passage of air around the peripheries thereof, and visual indicators mounted on the exterior of said body for disclosing temperature conditions in each of the compartments.

8. A transportation facility comprising a body including top, bottom, side and end walls, doors in one of said side and end walls affording access to the interior of said body, rigid partitions movable longitudinally of the body dividing said body into a plurality of adjustable compartments, a closed refrigerating compartment disposed at the extremity of said body remote from the end wall provided with doors, a duct provided with a plurality of branches of graduated lengths mounted in said body and communicating with said refrigerating compartment, spaced vents in said branches communicating with said adjustable compartments, means for forcing refrigerated air from said refrigerating compartment through said duct into said adjustable compartments, closure means within each branch for selectively controlling the passage of air therethrough, control means for manually regulating said closure means, a second duct provided with a plurality of branches of graduated lengths having a plurality of spaced inlets for returning air from said compartments to the refrigerating compartment, and sealing means mounted upon said partitions for preventing passage of air around the peripheries thereof.

9. A transportation facility comprising a body including top, bottom, side and end walls, doors in one of said side and end walls affording access to the interior of said body, rigid partitions movable longitudinally of the body dividing said body into a plurality of adjustable compartments, said doors being so located as to provide independent access to each of said compartments, a closed refrigerating compartment disposed at the extremity of said body remote from the end wall provided with doors, a duct having a plurality of branches mounted in said body and providing selective communication between the refrigerating compartment and the adjustable compartments, closure means within each branch for selectively controlling the passage of air therethrough, a second duct having a plurality of branches provided with spaced inlets for returning air from said adjustable compartments to the refrigerating compartment, and sealing means upon said partitions for preventing passage of air around the peripheries thereof.

References Cited in the file of this patent

UNITED STATES PATENTS

| Number | Name | Date |
|---|---|---|
| 281,421 | Wight | July 17, 1883 |
| 1,341,744 | Hatch | June 1, 1920 |
| 2,005,086 | Jones | June 18, 1935 |
| 2,190,796 | Michalske | Feb. 20, 1940 |
| 2,266,986 | Murphy | Dec. 23, 1941 |
| 2,466,994 | Martin | Apr. 12, 1949 |
| 2,479,128 | Maniscalo | Aug. 16, 1949 |
| 2,501,141 | Plummer et al. | Mar. 21, 1950 |
| 2,523,957 | Kleist | Sept. 26, 1950 |
| 2,530,598 | Christman | Nov. 21, 1950 |
| 2,534,272 | Kleist | Dec. 19, 1950 |

FOREIGN PATENTS

| Number | Country | Date |
|---|---|---|
| 279,754 | Great Britain | Nov. 3, 1927 |